United States Patent
Kahng et al.

(10) Patent No.: US 9,229,686 B2
(45) Date of Patent: Jan. 5, 2016

(54) ACCURACY CONFIGURABLE ADDERS AND METHODS

(75) Inventors: Andrew B. Kahng, Del Mar, CA (US); Seokhyeong Kang, La Jolla, CA (US)

(73) Assignee: The Regents of the University of California, Oakland, CA (US)

( * ) Notice: Subject to any disclaimer, the term of this patent is extended or adjusted under 35 U.S.C. 154(b) by 603 days.

(21) Appl. No.: 13/595,711

(22) Filed: Aug. 27, 2012

(65) Prior Publication Data

US 2014/0059105 A1    Feb. 27, 2014

(51) Int. Cl.
*G06F 7/50* (2006.01)
*G06F 7/505* (2006.01)

(52) U.S. Cl.
CPC . *G06F 7/50* (2013.01); *G06F 7/505* (2013.01)

(58) Field of Classification Search
None
See application file for complete search history.

(56) References Cited

U.S. PATENT DOCUMENTS

| | | | |
|---|---|---|---|
| 4,605,966 A * | 8/1986 | Collins | 348/616 |
| 7,007,059 B1 | 2/2006 | Mohammed et al. | |
| 8,117,247 B1 | 2/2012 | Taylor | |
| 2009/0172452 A1 * | 7/2009 | Kong et al. | 713/330 |

OTHER PUBLICATIONS

Lu, Shih-Lien, "Speeding Up Processing with Approximation Circuts", Speeding Up Processing with Approximation Circuits, *Computer*, vol. 37, Issue 3, Mar. 2004, pp. 67-73.
Shin, Doochul, et al., "A Re-Design Technique for Datapath Modules in Error Tolerant Applications", *Asian Test Symposium*, 2008, ATS 08, 17th, Nov. 24-27, 2008, pp. 431-437.
Verma, Ajay, et al., "Variable Latency Speculative Addition: A New Paradigm for Arithmetic Circuit Design", *Design, Automation and Test in Europe*, 2008. DATE 2008, Mar. 10-14, 2008, pp. 1250-1255.
Zhu, Ning et al., "Design of Low-Power High Speed Truncation-Error-Tolerant Adder and Its Application in Digital Signal Processing", *IEEE Transactions on Very Large Scale Integration (VLSI) Systems*, vol. 18, No. 8, Aug. 2010, pp. 1225-1229.
Zhu, Ning, et al., "An Enhanced Low-Power High-Speed Adder for Error-Tolerant Application", *ISIC '09, Proceedings of the 2009 12th International Symposium on Integrated Circuits*, Dec. 14-16, 2009, pp. 69-72.

* cited by examiner

*Primary Examiner* — Michael D Yaary
(74) *Attorney, Agent, or Firm* — Greer, Burns & Crain, Ltd.

(57) ABSTRACT

A preferred method of accuracy configuration with an approximate adder receives two input operands and generates a first approximate adder output with a plurality of sub-adders having a first accuracy under a first condition. Error detection and correction is selectively enabled to generate a next approximate adder output having a second accuracy that is higher than the first accuracy under a second condition. In preferred embodiments, a pipelined architecture provides selectable stages and the enablement of each successive stage provides a high level of accuracy. Power gated control can achieve enablement of error correction stages to conserve power.

21 Claims, 5 Drawing Sheets

ACCURACY CONFIGURABLE ADDERS AND METHODS

STATEMENT OF GOVERNMENT INTEREST

This invention was made with Government support under DARPA Grant No. 00001755 (2009-DT-2049). The Government has certain rights in the invention.

FIELD

Fields of the invention include arithmetic circuitry, microelectronics and integrated circuits. Example applications of the invention include applications where approximation can increase performance or reduce power consumption with a simplified or to inaccurate circuits in application contexts where strict requirements are relaxed. Example applications are related to circuits used to provide output to human senses, because approximate arithmetic can be used to generate sufficient results rather than absolutely accurate results

BACKGROUND

Adders are key to many circuits, including microprocessor architectures. Adders perform critical operations including arithmetic functions (addition, subtraction, multiplication), comparison functions, and incrementing or decrementing functions. Adders are of interest as a bottleneck to further improvements in the performance of microprocessors and other general and specific purpose circuits.

Approximation has been recognized as providing an opportunity to increase performance or reduce power consumption through use of a simplified or inaccurate circuit in application contexts where strict requirements are relaxed. Approximate design enables a tradeoff of accuracy in computation versus performance and/or power. Various approximate arithmetic designs have been proposed that provide a fixed approximation to achieve a set performance. The approximation is designed at a level that provides an error rate that is an acceptable penalty. If error detection and correction is used, the penalty rate is set such that correction still results in a net speed/computation benefit.

Lu described a faster adder which has shorter carry chains and considers only the previous k bits of input in computing a carry bit. Lu, "Speeding Up Processing with Approximation Circuits", *IEEE Computer* 37(3) (2004) pp. 67-73. Verma et al. describe a modification of Lu's adder in the form of a variable latency speculative adder (VLSA). Verma et al., "Variable Latency Speculative Addition: A New Paradigm for Arithmetic Circuit Design" (*Proc.* 2008, pp. 1250-1255). The Verma et al. paper describes a modification of Lu's approximate fast adder that includes error detection and correction to Lu's design. This modification is a variable-latency adder that produces a correct result very fast with extremely high probability using an approximation. When an error is detected, a correction term must be applied and the correct result is produced after is a time delay. Shin et al. also propose a data path redesign technique for various adders which cuts the critical path in the carry chain. Shin et al., "A Re-Design Technique for Datapath Modules in Error Tolerant Applications" (*Proc. Asian Test Symp.,* 2008, pp. 431-437). Zhu et al. propose an error-tolerant adders (ETA). ETAI is divided into an accurate part and an inaccurate part to achieve approximate results. Zhu et al., "Design of Low-Power High-Speed Truncation-Error-Tolerant Adder and Its Application in Digital Signal Processing" (*IEEE Trans. on VLSI Systems* 18(8) (2010), pp. 1225-1229). ETAII cuts carry propagation to speed up the adder, and ETAIIM modifies ETAII by connecting carry chains in accurate MSB parts. Individually and collectively, these approximate adder designs produce almost-correct results at prescribed accuracy for a particular application, and obtain power reductions or performance improvements in return.

These prior techniques are therefore restricted or at least best-suited to particular application contexts. In contexts where the accuracy requirement can change dynamically, the previous methods' benefits from the accuracy tradeoff are reduced since the implementation must be targeted to the maximum accuracy requirement.

SUMMARY OF THE INVENTION

A preferred method of accuracy configuration with an approximate adder receives two input operands and generates a first approximate adder output with a plurality of sub-adders having a first accuracy under a first condition. Error detection and correction is selectively enabled to generate a next approximate adder output having a second accuracy that is higher than the first accuracy under a second condition. In preferred embodiments, a pipelined architecture provides selectable stages and the enablement of each successive stage provides a high level of accuracy. Power gated control can achieve enablement of error correction stages to conserve power.

REFERENCE NUMERALS IN DRAWINGS

Reference numbers in the drawings correspond to the following features in the drawings:

101 16-bit adder input A[15:0]
102 16-bit adder input B[15:0]
103 17-bit adder output SUM[16:0]
104 First sub-adder for four most-significant (MSB) bits
105 Second sub-adder for four middle bits
106 Third sub-adder for four least-significant (LSB) bits
107 Carry output SUM[16]
108 Output SUM[15:12]
109 Output SUM[11:8]
110 Output SUM[7:4]
111 Output SUM[3:0]
201 Bit-width of the sub-adder results (k)
202 Input A [N−1:N−k]
203 Input A[N−k−1:N−2k]
204 Input A[N−2k−1:N−3k]
205 Input A[N−3k−1:N−4k]
206 Input B[N−1:N−k]
207 Input B[N−k−1:N−2k]
208 Input B[N−2k−1:N−3k]
209 Input B[N−3k−1:N−4k]
210 Output carry bit
211 Output SUM[N−1:N−k]

212 Output SUM[N−k−1:N−2k]
213 Output SUM[N−2k−1:N−3k]
301 Approximate adder
302 Error detection and correction circuit
303 Input
304 $i$-th sub-adder
305 $(i+1)$-th sub-adder
306 Output of i-th sub-adder: $SUM_i$
307 Carry output of (i+1)-th sub-adder
308 Error bit from i-th sub-adder
309 Incrementor circuit
310 Error bit
311 Approximate output
312 Correct output
313 Output
314 Data stall
401 State 1
402 Stage 2
403 Input A
404 Input B
405 Approximate adder
406 Error bits
407 Approximate output
408 Error correction (with incrementor circuit)
409 Accurate mode signal
410 Power gating switches
411 Correct output
501 Stage 1
502 Stage 2
503 Stage 3
504 Stage 4
505 Input A
506 Input B
507 Approximate adder
508 Correction on S1
509 Correction on S2
510 Correction on S3
511 Errors on S1
512 Errors on S2
513 Errors on S3
514 Output S3 (MSB part)
515 Output S2
516 Output S1
517 Output S0 (LSB part)
518 Output

DETAILED DESCRIPTION OF THE PREFERRED EMBODIMENTS

The present invention recognizes that required accuracy varies according to applications, and 100% accurate results are still required in some situations. The invention provides adders and adding methods with run-time solutions that are scalable. To the knowledge of the inventors, but without limiting the nature of the advancement of the invention, it is not believed that previous approximate adders have been described that can configure the output accuracy during runtime. Previous approximate adders known to the inventors have difficulty detecting and correcting errors since they are designed for error-acceptable applications with a target accuracy. However, the present inventors have recognized that accurate computations are still required at certain times. The invention provides an approximate adder that supports both accurate and inaccurate computation with error-correction and accuracy-configuration capability.

A preferred embodiment of the invention is an accuracy-configurable approximate adder and adding method for which the accuracy of results is configurable during runtime. The preferred adder and method can adaptively operate in both approximate (inaccurate) mode and accurate mode. The preferred adder and method can achieve significant throughput improvement and total power reduction over conventional adder designs and methods. The preferred adder and method can be used in accuracy-configurable applications, and improves the achievable tradeoff between performance/power and quality.

A preferred embodiment includes an approximate adder section and an error detection and correction section. The approximate adder section will produce incorrect results when it processes specific input patterns. The error detection and correction section can detect and correct such incorrect results with a is small overhead.

A preferred embodiment implements an accuracy-configurable adder of the invention in combination with a pipelined architecture. In the pipelined accuracy configurable adder of the invention, each stage generates a result with different accuracy. The output accuracy increases as the number of pipeline stages increases. According to a specified or selected accuracy requirement, later stages of the pipeline can be turned off with a power gating technique. This reduces accuracy according to the specified or selected accuracy requirement and results in a desirable reduction in computational load, delay and power consumption further with the accuracy tradeoff.

Artisans will recognize that the invention can be applied to all arithmetic designs which allow inaccurate results during specific periods. The invention is applicable to datapath (arithmetic) parts of digital processors. In some applications, more accurate or totally accurate results are required under certain conditions—e.g., image processing in security cameras would require cleaner images after detecting a motion. In contexts where the required accuracy changes during runtime, accuracy configurable adders of invention can configure the accuracy of results and maximize the benefit of approximate operations.

Preferred embodiments of the invention will now be discussed with respect to the drawings. The drawings may include schematic representations, which will be understood by artisans in view of the general knowledge in the art and the description that follows. Features may be exaggerated in the drawings for emphasis, and features may not be to scale. It is to be noted, however, that the appended drawings illustrate only typical embodiments of this invention and are therefore not to be considered limiting of its scope, for artisans will recognize additional effective embodiments that are within the scope of the present invention.

Approximate Adder Architecture

Figure 1:
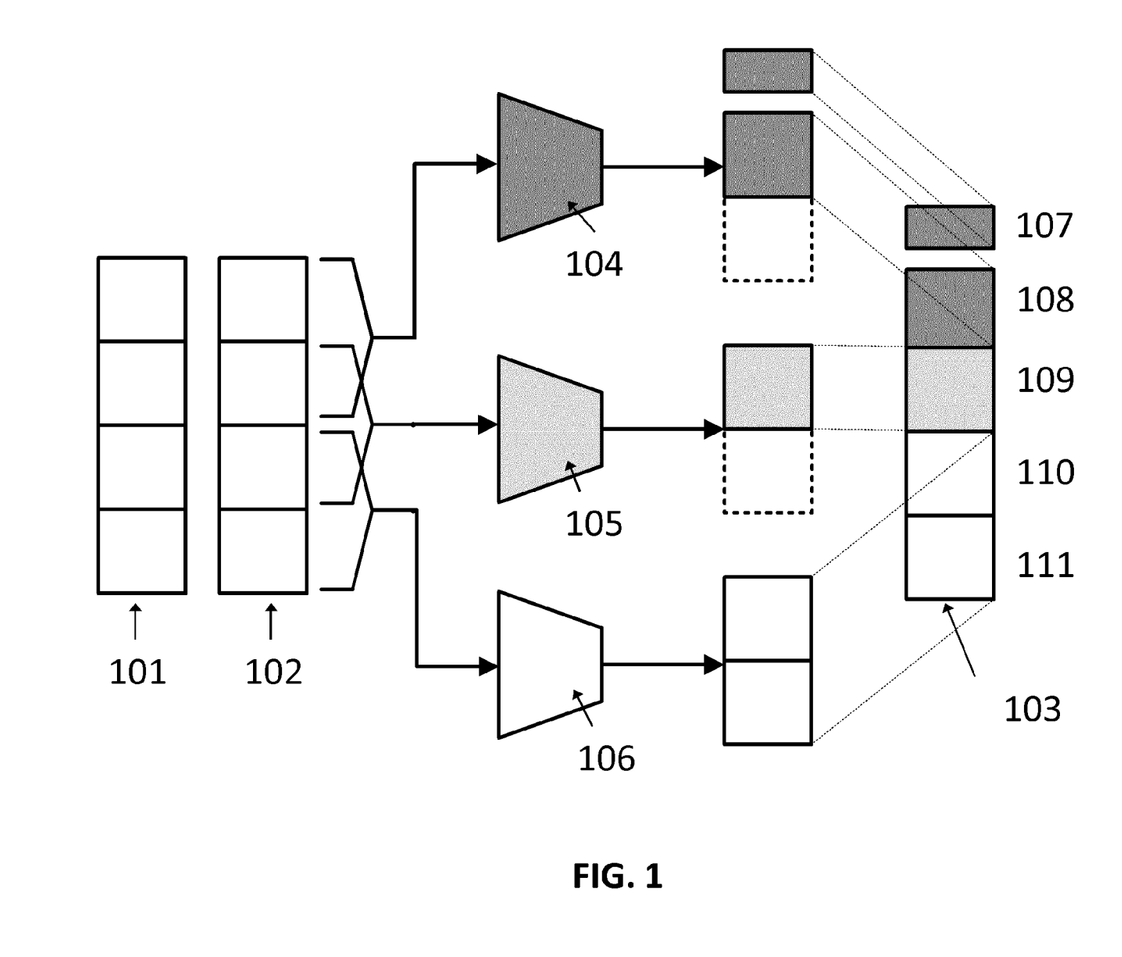
FIG. 1 is block diagram of a preferred embodiment accuracy configurable adder of the invention.

FIG. 1 shows a preferred approximate circuit for the case of a 16-bit adder, which is scalable to larger inputs, e.g., 32-bit and 64-bit inputs. The adder in FIG. 1 has two 16-bit inputs—A[15:0] 101 and B[15:0] 102, and generates 17-bit output results—SUM[16:0] 103. This indicates, for example, that data A is 16-bit, and each single bit is A[15], A[14], . . . , A[1], and A[0]. A[15] is MSB (most significant bit) and A[0] is LSB (least significant bit). In the adder, the carry chain is cut to reduce critical-path delay, and three sub-adders 104, 105 and 106 generate results of partial summations. Outputs of the first sub-adder 104 become carry output 107 and SUM[15:12] 108. Outputs of the middle sub-adder 105 and the last sub-adder 106 become SUM[11:8] 109 and SUM[7:0] 110, 111, respectively. The primary input 101 and 102 are 16-bit, and inputs of each sub-adder are 8-bit. Three sub-adders (104, 105 and 106) are 8-bit adder, and they generate 8-bit output. The blocks between sub-adders and output (103) are the 8-bit output data from sub-adders. 8-bit output of sub-adder 106 becomes the output [7:0] (110, 111) Among 8-bit output of sub-adder 105, 4-bit MSB data becomes the output [11:8] (109) mong 8-bit output of sub-adder 104, 4-bit MSB data becomes the output [15:12] (108) The carry bit (107) is generated from the sub-adder 104.

The sub-adders 104, 105 and 106 can be conventional adders, e.g., carry-look ahead adders (CLA), ripple-carry adders, Kogge-Stone adders. Any type of adders can be used for the sub-adders; and all sub-adders can be same type of adder, or can be mix of different type of adders. Another option is a Wallace tree adder. The Wallace tree adder is a three-input adder, and can receive three operands. The invention supports use of Wallace tree adders as the FIG. 1 sub-adders, and such a change does not affect error correction to enable configurable accuracy as indicated below.

With the reduced critical-path delay, high performance (by increasing the clock frequency) and/or low power consumption (by decreasing the operating voltage) is obtained. The second (middle) sub-adder 105 adds accuracy. Without the middle sub-adder 105, error occurs when the eighth carry bit is high, and for random input patterns the error rate is 50.1%. On the other hand, with the introduction into the computation path of the middle sub-adder, error rate for random input patterns is reduced to 5.5%. In preferred actual implementations, all redundant parts of sub-adders are optimized only for carry generation.

Figure 2:
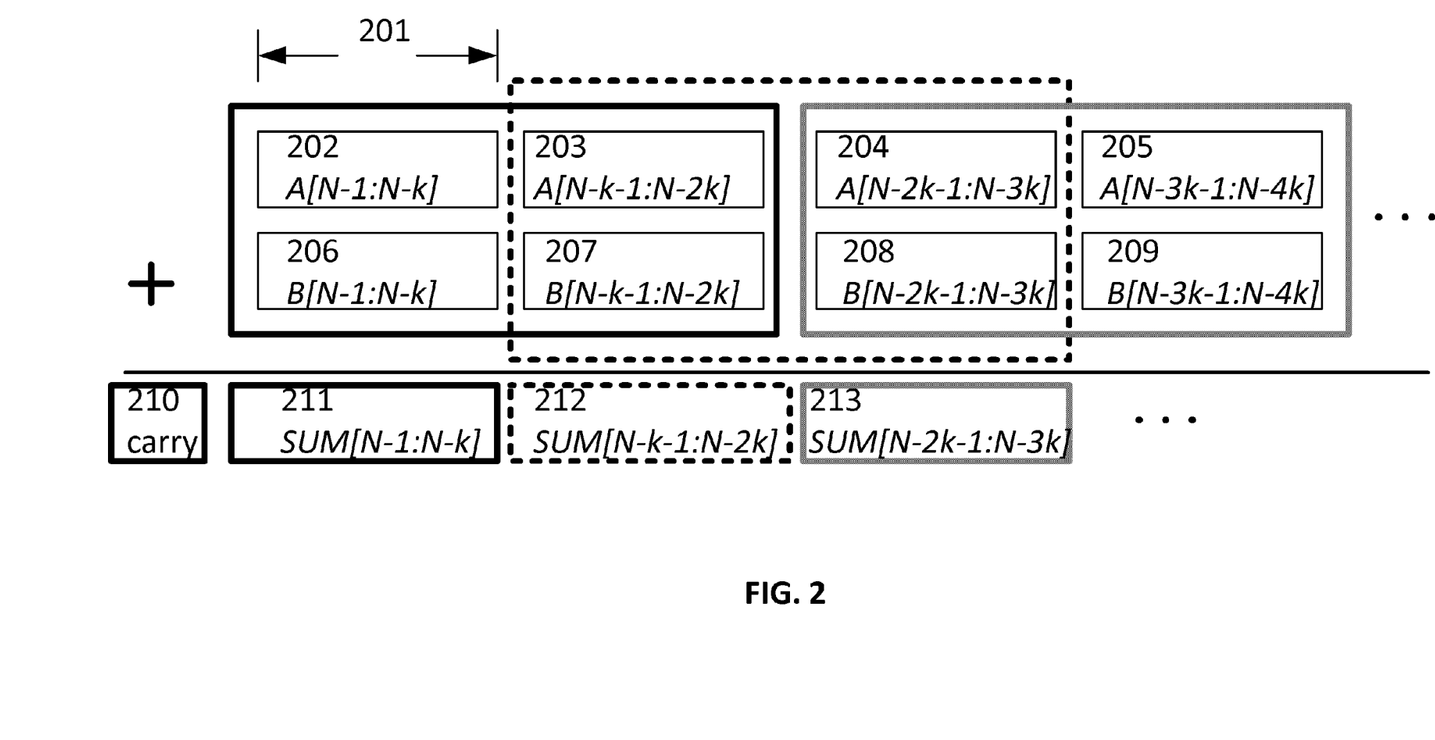
FIG. 2 illustrates a preferred example general implementation for adder of FIG. 1.

FIG. 2 shows a general arithmetic implementation of an N-bit adder with a parameter k 201, which is the bit-width of the 104 and 105 sub-adder result. The N-bit adder has two inputs—A[N−1:0] and B[N−1:0] —and generates (N+1)-bit output SUM[N:0]. In the adder, inputs are divided into 2k-bit for sub-adders, and each divided sub-module produces a k-bit result except for the last sub-module, which produces a 2k-bit result. The first sub-adder uses A[N−1:N−2k] 202, 203 and B[N−1:N−2k] 206 and 207, and produces carry output 210 and SUM[N−1:N−k] 211. The second sub-adder uses A[N−k−1:N−3k] 203, 204 and B[N−k−1:N−3k] 207, 208, and produces SUM[N−k:N−2k] 212. The third sub-adder uses A[N−2k−1:N−4k] 204, 205 and B[N−2k−1:N−4k] 208, 209, and produces SUM[N−2k−1:N−3k]. The approximate adder thus consists of the (N/k−1) sub-modules as described in the following Equation.

SUM[N−ik−1:N−(i+1)k]=A[N−ik−1:N−(i+2)k]+B[N−ik−1:N−(i+2)k], where i=0, . . . , N/k−2

In modern adder designs, such as carry-lookahead (CLA), carry select and Kogge-Stone adders, the path depth and area are asymptotically proportional to $\log_2 N$ and $N \log_2 N$ respectively, where N is the bit-width of the adder. Based on this, we can express delay, area and power consumption of the proposed adder in terms of the parameters N and k. The FIG. 1 and FIG. 2 adders of the invention have (N/k−1) sub-adders, each of which is a 2k-bit adder. Therefore, delay of the critical path and area can be expressed with the following equations, where $C_{delay}$ and $C_{area}$ are constants for delay and area, respectively.

delay=$C_{delay}(\log_2 k+1)$ area=$C_{area}(N-2k)(\log_2 k+1)$

In the adder design, the output of each sub-adder (except the last sub-adder) is incorrect when a carry signal is supposed to be propagated between sub-adders. In FIG. 1, when the carry from the third sub-adder 106 is '1' and the second sub-adder result 109 is $1111_{(2)}$, the output result of the first sub-adder has an error in SUM[15:12] 108. In the general implementation shown in FIG. 2, the output result will be correct when there are no errors in all (N/k−1) sub-adders. In the $i^{th}$ sub-adder, errors occur when (1) the LSB part of the result (SUMi[k−1:0]) has all '1' values (probability P=1−2k) and (2) the LSB part ([k−1:0]) of the (i+1)$^{th}$ sub-adder produces a carry bit (probability P=¼+½×¼+½×½×¼+ . . . ). Therefore, with a random input vector, the probability of having a correct result in the proposed adder is expressed with the following equation.

$$P(N, k) = \left(1 - \frac{1}{2^k} \cdot \frac{2^k - 1}{2^{k+1}}\right)^{\frac{N}{k}-2}$$

With the parameter k, we can configure the characteristic of approximate adder during design time.

Error Detection and Correction

As described above, configurable adders of the invention will be incorrect when a carry bit is propagated between sub-adders. However, the error can be detected and corrected with a small overhead in accordance with the invention. A low overhead error detection is accomplished by detecting an error for each sub-adder by checking the output of the sub-adder and the carry-in signal that comes from the previous sub-adder. Error detection can be implemented with several 'and' gates. To correct the error, '1' should be added to the approximate (inaccurate) output, and the error correction can be implemented with an incrementor circuit.

Figure 3:
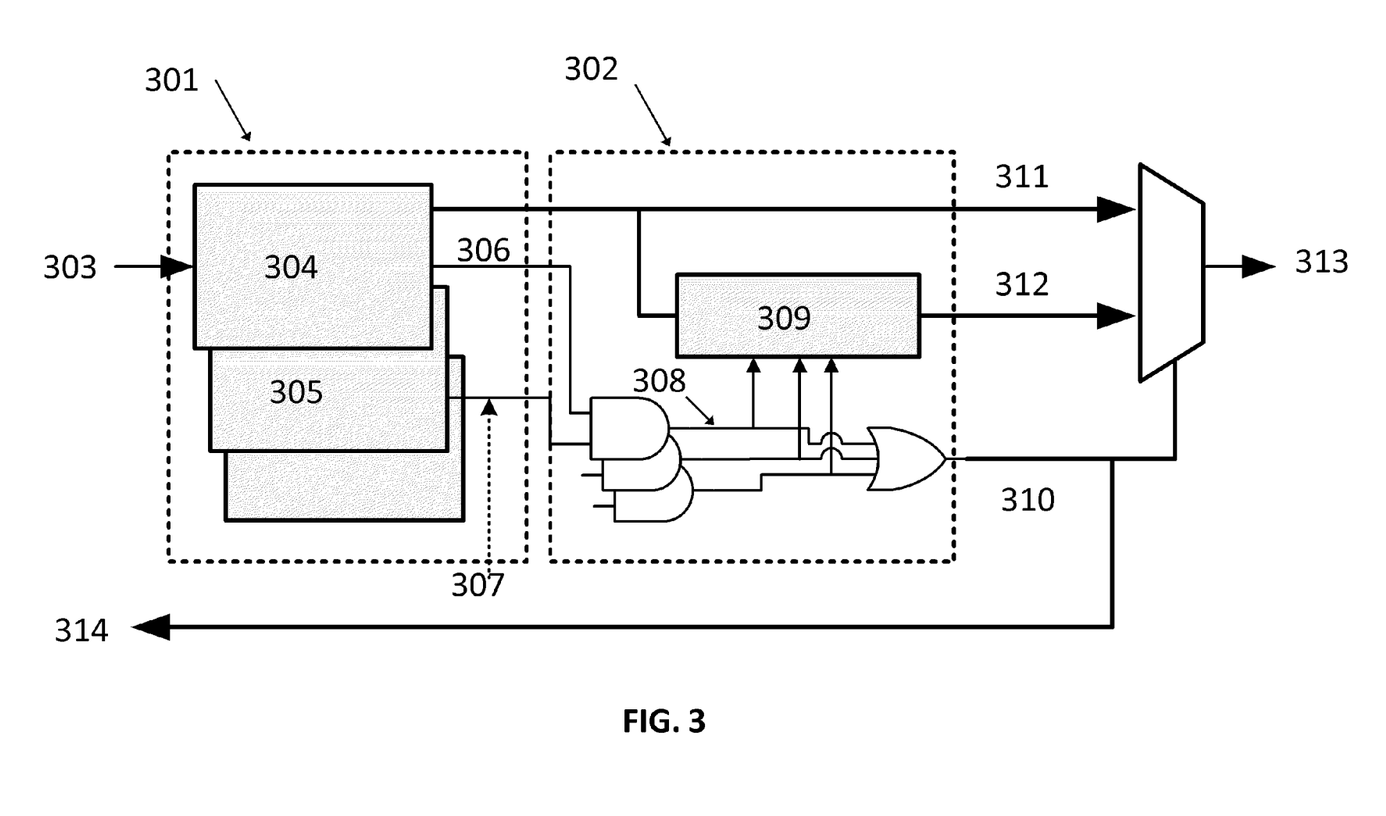
FIG. 3 illustrates a circuit for error detection and correction with the adder of FIG. 1.

FIG. 3 illustrates a preferred embodiment error detection and correction (EDC) circuit having variable latency with a small overhead. The FIG. 3 circuit can be implemented with any configurable adder of the invention, including those shown in FIGS. 1 and 2. The approximate configurable adder 301 produces approximate output results 311 from input data 303. Sub-adders 304, 305 provide output value 306 and carry output 307 into the error detection and correction circuit 302. The error detection circuit (AND gates) checks the carry propagation and generates an error signal 308. The error correction (incrementor) circuit 309 produces an error-free output (312) by adding compensation data, and requires an additional clock cycle. When errors are detected from input patterns, the error signal is activated. The error signal 314 holds the input pattern during the error correction and chooses the error-corrected value 312 as an output. With this approach, the approximate adder can provide accurate results at a higher clock frequency than that of conventional adders (e.g., CLA). Accuracy configuration will be done in the error-detection and correction EDC stage. If more accuracy is required, the EDC stage is turned on. Otherwise, the EDC stage can be turned off, e.g., with a power gating technique. The required accuracy can be determined by each application (software). For example, a security camera can record less accurate images during a standby mode, and can increase accuracy when motion has been detected.

Accuracy Configuration with Pipelined Architecture

Figure 4:
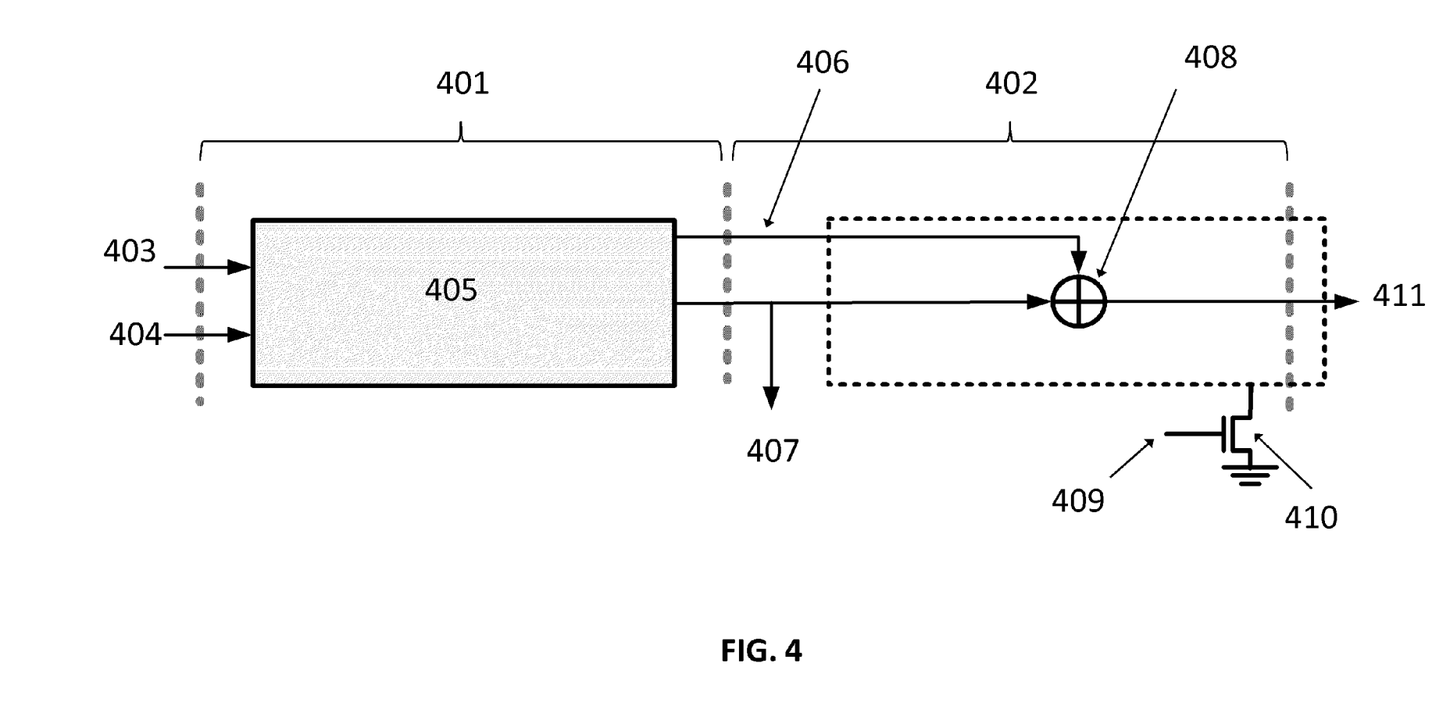
FIG. 4 is a block diagram of a pipelined adder architecture.

A pipelined embodiment of the invention, shown in FIG. 4, permits accurate results with the same throughput as a conventional adder. In the pipelined architecture, approximate additions are computed at a first pipeline stage 401 and error correction can be completed in a subsequent stage 402. The approximate adder 405 produces approximate output 407 in the first pipeline stage 401. An error bit 406 is generated with the error detection circuit (308) of FIG. 3. In the second pipeline stage 402, the error is corrected with the incrementor circuit 408. The pipelined implementation of the proposed approximate adder invention has a structural analogy with the pipelined adder of the patent "Fast Pipelined Adder/Subtractor using Increment/Decrement Function with Reduced Register is Utilization" (U.S. Pat. No. 7,007,059, 2006, incorporated by reference herein) in which partial summations are performed at the first stage and carry bits are added at the later stages. However, the '059 patent is directed to accurate operations, and not approximate computations.

In the pipelined approach, there is no improvement of the clock frequency since the achievable clock period is the same as that of the conventional adder. However, power benefits are obtained through configuration of accuracy: in the approximate mode, the error correction stage is power-gated with foot (and/or head) switches 410, and power reduction over the conventional adder design can be achieved. The switches 410 are controlled by a mode signal 409. The foot (head) switches are placed between the voltage ground (supply) and a given block of functional circuitry; the block's leakage is stopped when the switch cuts off the current path from supply to ground.

To achieve higher performance or lower power consumption, we can reduce the carry chain depth (k) of sub-adders. However, when k is less than N/4, it is impossible to correct all errors and achieve 100% correct results within one clock cycle since the error-correction paths become critical. To achieve correct results in the pipelined implementation, the error-correction stage should be extended to multiple stages.

Figure 5:
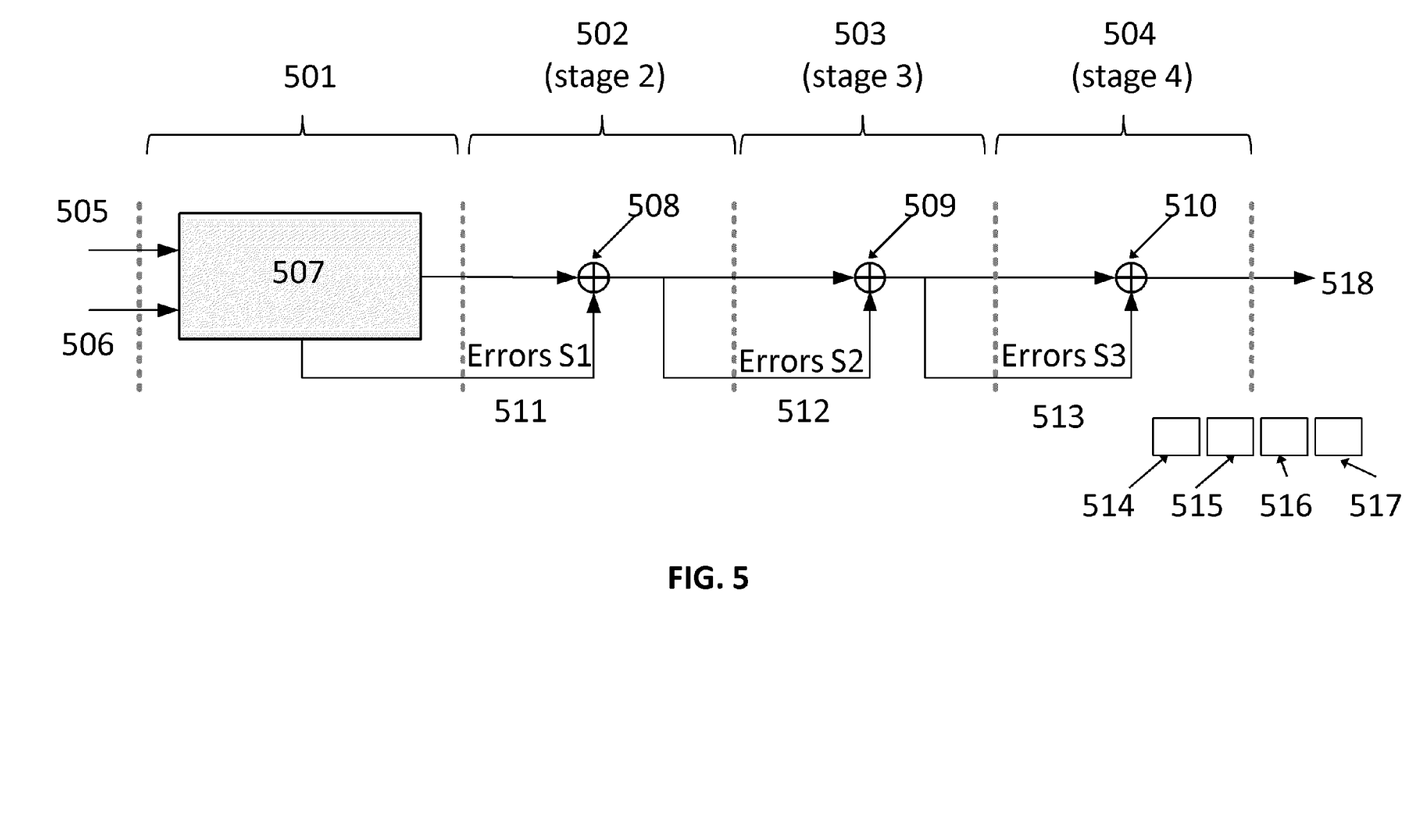
FIG. 5 illustrates a preferred embodiment accuracy-configurable implementation of the invention for the pipelined adder of FIG. 4.

FIG. 5 illustrates such a pipelined adder implementation (k=N/8 case), in which four pipeline stages are required to achieve a 100% accurate result. In the pipelined adder, each stage 501, 502, 503, 504 is structured as in FIG. 4 and generates a result with different accuracy; the output accuracy increases as the number of pipeline stages increases. The output of approximate adder 507 is composed with S3—MSB (514), S2 (515), S1 (516) and S0—LSB (517) parts. Errors on S1, S2 and S3 are corrected in the second (508), third (509) and fourth (510) stages, respectively. According to the accuracy requirement, the later stages may be turned off the later stages with the power gating technique, and the power consumption may be reduced further with the accuracy tradeoff. Artisans will appreciate that approximate configurable adders of the present invention support both approximate and accurate results, and can therefore be advantageously used in applications that require accurate results only under certain conditions. Conventional accurate designs are energy-inefficient in the error-acceptable application context, because they always compute the exact function. Previous approximate designs cannot handle a varying accuracy requirement, which limits the benefit of the accuracy tradeoff: as noted above, the approximate function must meet the maximum accuracy threshold across all applications—in other words, for each individual application. Moreover, if the application requests an exact computation, additional accurate circuits must be added to the previous approximate designs. By contrast, accuracy configurable adders of the present invention efficiently exploit a tradeoff between accuracy and power/performance with its runtime accuracy configurability.

Experimental Results

Designs of the invention have been simulated. The experiments with simulations show excellent performance potential and advantages.

To test approximate designs, each design was written in Verilog and synthesized it to a TSMC 65GP cell library with Synopsys Design Compiler. Gate-level simulations were performed using Cadence NC-Sim. In the simulations, gate delay was taken from an SDF (standard delay format) file. For voltage scaling experiments, a Synopsys Liberty (.lib) file for each voltage was prepared from 1.00V to 0.60V in 0.01V increments, using the Cadence Library Characterizer v9.1. The prepared libraries were used for SDF file generation and power estimation at each voltage. Each simulation was performed with input patterns for one million cycles. During the simulation, each output value is compared with a reference (correct) value to produce the accuracy metrics. Random data, as well as actual data from SPEC 2006 benchmarks were used as input patterns. Operand data was extracted from ADD instructions in the SPEC benchmarks.

To quantify errors in approximate designs, two metrics have been previously proposed. See, M. A. Breuer, "Intelligible Test Techniques to Support Error-Tolerance", Test Symposium, pp. 386-393 (2004). Error rate (ER) is the percentage of cycles in which output value is different from the correct value. Error significance (ES) is the numerical difference between correct and output results. which quantifies the amount of error. In image/video applications, uses the product of ES and ER can be used as a metric of error tolerance. See, I. Chong et al., "New Quality Metric for Multimedia Compression Using Faulty Hardware", Proc. International Workshop on Video Processing and Quality Metrics for Consumer Electronics, pp. 267-272 (2006). ES×ER can be used as criterion for acceptability, called an acceptance threshold, where the acceptance threshold is specified according to the application. See, D. Shin and S. K. Gupta, "A Re-Design Technique for Datapath Modules in Error Tolerant Applications", Asian Test Symp., pp. 431-437 (2008). For the error significance (ES) metric, only amplitude of error needs to be considered for certain applications. N. Zhu et al., "Design of Low-Power High-Speed Truncation-Error-Tolerant Adder and Its Application in Digital Signal Processing", IEEE Trans. on VLSI Systems, 18(8) pp. 1225-1229 (2010). This approach is useful for many digital signal processing (DSP) systems that process, e.g., sound and image data. However, in communication systems that mainly handle information data, the number of incorrect bits (Hamming distance).

A metric for the amplitude data can be labeled $ACC_{amp}$ and is defined as $1-|R_C-R_e|R_C$, where $R_C$ and $R_e$ are the correct and obtained results, respectively. We provide an additional metric for information data, $ACC_{inf}$, that measures error significance as Hamming distance. This metric is defined as $1-B_e-B_w$, where $B_e$ is the number of error bits and $B_w$ is the bit-width of the data. The amplitude and significance metrics were averaged over the entire simulation to evaluate the approximate circuits.

Table I summarizes results—minimum clock period, area, error rate and throughput improvements—for each implementation of the 16-bit adder with different k values. According to the results, with smaller k, the minimum operating frequency increases, but the error rate increases as well. With higher k, the error rate is reduced significantly, but the benefit of the approximate circuit, i.e., clock period reduction, is small. In the table, throughput improvement over conventional design is calculated including error recovery overhead. From the implementations, a maximum throughput improvement is achieved when k=3. If we correct erroneous results with error correction and detection as in FIG. 3, then 17.2% additional clock cycles are required for error correction. With this overhead, the present configurable approximate adder with error correction can improve data throughput by 24.6% over a conventional CLA adder.

TABLE I

|  | k | | | |
|---|---|---|---|---|
|  | 2 | 3 | 4 | 5 |
| min. clock period (ps) | 180 | 190 | 220 | 230 |
| area (um²) | 550 | 990 | 920 | 840 |
| pass rate (%) | 55.3 | 82.8 | 94.0 | 98.1 |
| throughput improvement (%) | 11.3 | 24.6 | 22.3 | 21.4 |

Gate-level simulation at each possible clock period was conducted to compare five adders: carry look-ahead adder (CLA), Lu's adder (S.-L. Lu, "Speeding Up Processing with Approximation Circuits", Computer, 37(3) (2004) pp. 67-73), ETAI, ETAIIM (N. Zhu, W. Goh, W. Zhang, K. Yeo and Z. Kong, "Design of Low-Power High-Speed Truncation-Error-Tolerant Adder and Its Application in Digital Signal Processing", IEEE Trans. on VLSI Systems, 18(8) (2010), pp. 1225-1229) and the present accuracy configurable adder (without error correction). In the experiment, the same carry-chain width (8-bit) is selected for the four approximate adders. In the implementation, a register (flip-flop) is inserted in each output port to detect timing errors.

Table II shows area, pass rate, accuracy, minimum clock period and EDC overhead for each adder design. According to the results, the ETAI adder has is the smallest design area, but has a low pass rate and limited accuracy with respect to the $ACC_{inf}$ metric. Therefore, the ETAI adder is preferred for applications which allow low accuracy in results. The ETAIIM adder shows fairly high accuracy, but does not have speed (clock period) benefit. Lu's adder shows a smaller error rate and high accuracy with respect to both $ACC_{amp}$ and $ACC_{inf}$ metrics. However, it requires larger area than the other designs. The present adder (ACA) shows similar results for both metrics as Lu's adder. However, the area of the present adder is smaller than that of Lu's adder, and EDC is possible with small area overhead (28%). With the present adder, the minimum clock period can be reduced by 26% compared to the accurate CLA.

TABLE II

|  | CLA | LU | ACA | ETAI | ETAIIM |
|---|---|---|---|---|---|
| area (um²) | 910 | 1356 | 923 | 576 | 678 |
| min. clock period (ps) | 280 | 210 | 200 | 200 | 260 |
| pass rate (%) | 100 | 99.2 | 94.1 | 10.0 | 97.0 |
| $ACC_{amp}$ (maximum) | 1.000 | 0.998 | 0.997 | 0.999 | 0.999 |
| $ACC_{inf}$ (maximum) | 1.000 | 0.999 | 0.993 | 0.694 | 0.996 |
| area overhead for EDC | N/A | 75% | 28% | N/A | 15% |

The pipelined architecture of FIG. 5 was also tested in the simulations. In the pipelined architecture, the present adder can provide various configurable modes according to the pipeline depth. To improve the design performance, increase the pipeline depth; the deeper pipeline reduces the path depth of the design. In the conventional pipelined adder, bit-width of the adder in each stage can be reduced to N/#stage, where N is the entire bit-width and #stage is the depth (number) of the pipeline stages. In the present adder, the value of parameter k can be reduced with deeper pipeline depth. To show the benefit of accuracy configuration, a 32-bit ACA adder (N=32, k=4) with 4-stage pipeline was simulated and compared with a conventional pipelined adder with an 8-bit CLA in each stage. Table III shows the implemented results for the 32-bit pipelined adder of the invention. For the accuracy estimation, random patterns of is one million cycles are used. The ACA adder can operate in four different modes with the power gating of each stage. The modes show different power consumptions and different achievable accuracies. From the results, due to the presence of recovery circuits, the present adder consumes 11.5% more power than the conventional adder in accurate mode (mode-1). At the same time, it shows a significant power reduction with approximate modes: 12.4%, 31.0% and 51.6% at mode-2, mode-3 and mode-4, respectively. Data showed that accuracy configuration with the mode change is much more effective than with voltage scaling, in terms of the tradeoff between accuracy and power.

TABLE II

| config. | power-gating | $ACC_{amp}$ (max.) | $ACC_{inf}$ (max.) | total power (mW) | reduction (%) |
|---|---|---|---|---|---|
| mode-1 | none | 1.000 | 1.000 | 5.962 | −11.5% |
| mode-2 | stage-4 | 0.998 | 0.960 | 4.683 | 12.4% |
| mode-3 | stage-3, 4 | 0.991 | 0.925 | 3.691 | 31.0% |
| mode-4 | stage-2, 3, 4 | 0.983 | 0.900 | 2.588 | 51.6% |

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A method of accuracy configuration with an approximate adder, the method comprising the steps of:
   receiving two input operands;
   generating a first approximate adder output with a plurality of sub-adders having a first accuracy under a first condition; and
   selectively enabling an error detection and correction circuit to generate a next approximate adder output having a second accuracy that is higher than the first accuracy under a second condition.

2. The method of claim 1, wherein the error detection and correction circuit checks carry propagation and adds compensation data to the first approximate adder output to produce the next approximate adder output.

3. The method of claim 1, wherein at least one of the said sub-adders is a carry-look ahead adder circuit.

4. The method of claim 1, wherein at least one of the said sub-adders is a ripple-carry adder circuit.

5. The method of claim 1, wherein at least one of the sub-adders is a Kogge-Stone adder circuit.

6. The method of claim 1, wherein at least one of the sub-adders is a Wallace tree adder circuit.

7. The method of claim 1, wherein said approximate output is concatenated from each sub-adder output.

8. The method of claim 1, implemented in a pipelined architecture including a plurality of stages with error detection and correction, wherein one or more stages are power gated with one or more foot switches.

9. The method of claim 1, implemented in a pipelined architecture including a plurality of stages with error detection and correction, wherein one or more stages are power gated with one or more head switches.

10. The method of claim 1, implemented in a pipelined architecture including a plurality of stages with error detection and correction, wherein one or more stages are power gated to create the accuracy configuration during runtime.

11. The method of claim 1, wherein the specified or selected accuracy is specified by an application program being executed.

12. A method of accuracy configuration implemented in a pipelined adder configuration having a plurality of pipeline stages, each having a configurable approximate adder and an error corrector, the method comprising steps of:
- receiving comprises receiving two N-bit operands, and generating a first approximate adder output with an approximate adder at a first pipeline stage;
- correcting errors of the approximate adder output at a next one or more pipeline stages thereby increasing the accuracy of approximate results in each pipeline stage in generating the next one or more outputs; and
- generating an N-bit final result selected from outputs of each of the first and next one or more pipeline stages according to a specified or selected accuracy.

13. The method of claim 12, wherein the steps of generating a first and next outputs employ an approximate adder which is divided into 2k-bit sub-adders by cutting the carry chain in each k-bit position.

14. The method of claim 13, wherein k is a number not larger than N/2.

15. The method of claim 12, wherein the next one or more stages are power-gated.

16. A method of accuracy configuration with an approximate adder, the method comprising the steps of:
- receiving two input operands;
- generating a first approximate adder output with a plurality of sub-adders having a first accuracy under a first condition; and
- selectively enabling an error detection and correction circuit to generate a next approximate adder output having a second accuracy that is higher than the first accuracy under a second condition, by
- detecting an error in an approximate result from sub-adders, if such error exists, by checking carry propagation between sub-adders;
- generating an error signal from said detecting;
- correcting the errors in approximate results with an incrementor circuit; and
- selecting a final result between the approximate result and the corrected result that is generated from the incrementor circuit.

17. The method of claim 16, wherein the step of detecting an error checks the carry propagation using AND gates which have a carry bit and sub-adder output bits as inputs.

18. The method of claim 16, wherein the step of generating an error signal generates a multi-bit error signal by combining error bits from more than one sub-adder.

19. The method of claim 16, wherein said incrementor circuit adds '1' into one or more bit positions of the input based on the multi-bit error signal.

20. A variable configurable adder, comprising;
- a plurality of approximate sub-adders and error detection and correction circuits in a pipelined architecture;
- a selector to select between a first output that is based upon error detection and correction of a first group of said approximate sub-adders that is less than all of said plurality of approximate sub-adders and a second output that is that is based upon error detection and correction of a second group of said approximate sub-adders that includes said first group of approximate sub-adders and additional sub-adders.

21. The variable configurable adder of claim 20, wherein enabling each successive stage contributes a higher level of accuracy.

* * * * *

UNITED STATES PATENT AND TRADEMARK OFFICE
CERTIFICATE OF CORRECTION

| | | |
|---|---|---|
| PATENT NO. | : 9,229,686 B2 | Page 1 of 1 |
| APPLICATION NO. | : 13/595711 | |
| DATED | : January 5, 2016 | |
| INVENTOR(S) | : Kahng et al. | |

It is certified that error appears in the above-identified patent and that said Letters Patent is hereby corrected as shown below:

In the Specification:

Col. 1, line 20   Please insert a --.-- after "accurate results".

Col. 1, line 54   Please delete "fast" and insert --quickly-- therefor.

Col. 3, line 17   Please delete "401 State" and insert --401 Stage-- therefor.

Col. 5, line 4    Please delete "mong" and insert --. Among-- therefor.

Col. 5, line 5    Please insert a --.-- after "(108)".

Col. 7, line 40   Please insert a --.-- after "tradeoff".

Col. 9, line 25   Please delete "is" between "has" and "the".

Col. 9, line 67   Please delete "is" between "of" and "one".

Col. 10, line 12  Please delete "Table II" and insert --Table III-- therefor.

Signed and Sealed this
Twenty-third Day of August, 2016

Michelle K. Lee
*Director of the United States Patent and Trademark Office*